United States Patent [19]

Tung et al.

[11] 4,431,777
[45] Feb. 14, 1984

[54] BLOCK COPOLYMERS OF DIENE HAVING THEIR TERMINAL END BLOCKS OF A RANDOM COPOLYMER OF STYRENE OR ALKYLSTYRENE AND AN ALPHA-METHYLSTYRENE

[75] Inventors: Lu H. Tung; Grace Y. Lo, both of Midland, Mich.

[73] Assignee: The Dow Chemical Company, Midland, Mich.

[21] Appl. No.: 442,337

[22] Filed: Nov. 17, 1982

Related U.S. Application Data

[63] Continuation of Ser. No. 288,622, Jul. 30, 1981, abandoned, which is a continuation of Ser. No. 169,575, Jul. 17, 1980, abandoned, which is a continuation-in-part of Ser. No. 95,696, Nov. 19, 1979, abandoned, which is a continuation-in-part of Ser. No. 12,539, Feb. 15, 1979, abandoned.

[51] Int. Cl.³ .......................................... C08F 297/04
[52] U.S. Cl. .................................................. 525/314
[58] Field of Search ......................................... 525/314

[56] References Cited

U.S. PATENT DOCUMENTS 3,265,765 8/1966 Holden ............................... 525/314
4,201,848 5/1980 Kotani ................................ 525/314

Primary Examiner—Paul R. Michl
Attorney, Agent, or Firm—R. B. Ingraham

[57] ABSTRACT

Block copolymers are prepared having end blocks with random copolymer of styrene and/or alkyl substituted derivatives and alpha-methylstyrene ranges from 1:0.5 to 1:2.5, a central block of a polydiene polymer joins the terminal blocks. The block copolymers contain from 10 to 90 weight percent of polydiene, the remaining portion being of random (alkyl) styrene-alpha-methylstyrene copolymer. The polymers range from medium impact polystyrene type polymer of low polydiene content to thermoplastic elastomers of high polydiene content.

12 Claims, No Drawings

BLOCK COPOLYMERS OF DIENE HAVING THEIR TERMINAL END BLOCKS OF A RANDOM COPOLYMER OF STYRENE OR ALKYLSTYRENE AND AN ALPHA-METHYLSTYRENE

CROSS-REFERENCE TO RELATED APPLICATION

This is a continuation of application Ser. No. 288,622, filed July 30, 1981, abandoned, which is a continuation of application Ser. No. 169575 filed July 17, 1980, abandoned, which is a continuation-in-part of our co-pending U.S. patent application Ser. No. 95,696 filed Nov. 19, 1979 now abandoned which is a continuation-in-part of our co-pending U.S. patent application Ser. No. 12,539 filed Feb. 15, 1979, now abandoned.

Block copolymers of the configuration $AB(BA)_n$ wherein n is an integer of from 1 to 3 inclusive and A represents a random copolymer of an alkenyl aromatic monomer and α-methylstyrene and B represents a block of a polymer of one or more conjugated dienes, certain block copolymers, for example certain block copolymers of the structure polystyrene-polyisoprene-polystyrene and polystyrene-polybutadiene-polystyrene, show the unique feature that without being vulcanized they have at ambient temperature elastomeric properties including strength properties, comparable to those of conventional vulcanizates and are reversibly plastifiable. They are also good impact plastics if the polydiene content is kept low. The known block copolymers, however, are somewhat deficient in that they either exhibit relatively poor low temperature performance or poor high temperature performance. Known block copolymers having terminal polymer blocks of styrene and α-methylstyrene show improved high temperature performance in comparison with those with terminal polymer blocks of styrene, but their polydiene center block contains high 1,2-vinyl structure which raised the glass temperature of the polydiene block and thus contributed to poor low temperature properties.

It would be desirable if there were available an improved block copolymer which has a relatively high heat distortion temperature and also exhibits good low temperature properties.

It would be desirable if there were available a method of preparation of such polymers.

It would be desirable if there were available a medium impact resin having a high degree of transparency, good low temperature properties and improved heat distortion.

It would be desirable also if an improved thermoplastic elastomer having desired low temperature and improved heat distortion properties were available.

It would be desirable also if there were available an improved soft thermoplastic resin with good heat distortion and low temperature properties.

These benefits and other advantages in accordance with the present invention are achieved in a block copolymer, the block copolymer having the configuration $AB(BA)_n$ wherein n is an integer of from 1 to 3 inclusive (preferably n=1); A represents a block which is a random copolymer of an alkenyl aromatic monomer and an α-methylstyrene, wherein the mole ratio of the alkenyl aromatic monomer to the α=methylstyrene ranges from 1:0.5 to 1:2.5 and preferably from about 1:1 to 1:2, B represents a diene polymer selected from a group consisting of 1,3-butadiene, isoprene and mixtures thereof wherein the polydiene contains not over 25 percent mole 1,2 vinyl groups, the polydiene blocks having polymerized therein from 0 to 10 weight percent of an alkenyl aromatic compound, the polydiene blocks being 2 to 98 weight percent and the alkenyl aromatic monomer the α=methylstyrene blocks being from 98 to 2 weight percent of the polymer.

Also contemplated within the scope of the present invention is a method for the preparation of a block copolymer having the configuration $AB(BA)_n$ wherein n is an integer of from 1 to 3 inclusive (preferably n=1); A represents a block which is a random copolymer of an alkenyl aromatic monomer and an α=methylstyrene, wherein the mole ratio of alkenyl aromatic monomer to the α=methylstyrene ranges from 1:0.5 to 1:2.5 and preferably from about 1:1 to 1:2, B represents a polydiene selected from a group consisting of 1,3-butadiene, isoprene and mixtures thereof where the polydiene contains not over 25 mole percent 1,2 vinyl groups, the polydiene blocks having polymerized therein from 0 to 10 weight percent of an alkenyl aromatic compound, the polydiene blocks having 2 to 98 percent and the alkenyl aromatic monomer -α=methylstyrene blocks being from 98 to 2 weight percent of the polymer, the steps of the method comprising polymerizing the diene monomer in a hydrocarbon solvent, and optionally in the presence of at least one α=methylstyrene monomer, employing a multifunctional lithium polymerization initiator in the absence of oxygen and moisture at a temperature of from about 40° to 120° C. to provide a living diene polymer block of desired molecular weight dissolved in the hydrocarbon solvent, adding a polar solvent to the hydrocarbon solvent containing the living diene polymer and the α=methylstyrene, adding the α=methylstyrene if not already present, and then adding continuously the alkenyl aromatic monomer at a rate whereby a random alkenyl aromatic monomer α=methylstyrene polymer blocks are polymerized and chemically attached to the polydiene block. By the term alkenyl aromatic monomer is meant a monomer of the formula:

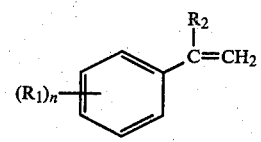

where n is an integer from 0 to 3, $R_1$ is an alkyl radical containing up to 5 carbon atoms and $R_2$ is hydrogen. Preferred alkenyl aromatic monomers include styrene, vinyltoluene, (all isomers alone or in admixture); particularly desirable in paravinyltoluene.

By the term α=methylstyrene is meant a compound of the above formula wherein $R_1$ is an alkyl radical containing up to 5 carbon atoms and $R_2$ is methyl.

The resultant block copolymers may be elastomeric or resinous depending upon the portions of the ingredients selected. Polymers prepared employing low portions of the diene, i.e., 2 to 40 weight percent polydiene, are generally resinous, transparent, and particularly suited for packaging applications where both low temperatures and high temperatures are encountered; for example, frozen foods which are subsequently heated prior to serving. Polymers in accordance with the present invention which contain higher proportions of the polydiene block; for example, from 55 to 98 weight percent polydiene, provide desirable thermoplastic elastomers having a relatively high service temperature and highly desirable low temperature characteristics. Polymers containing from about 40 to 55 weight percent diene are what might be considered soft plastics. The molecular weight of the block copolymer in accordance with the present invention as determined by gel permeation chromatography will vary from about 5,000 to 500,000 molecular weight units. Particularly desirable polymers for most applications have a molecular weight range from about 80,000 to 300,000 molecular weight units. The term "random" as employed in the present invention is not used to mean that the two monomers in the copolymer are alternating in a one to one manner or conform strictly to random statistics. It is employed to mean that extensive block-like structures of polymerized alkenyl aromatic monomer or a polymerized α-methylstyrene monomer do not exist.

Preferably the polymer blocks B are elastomeric polymer blocks of an unsaturated diene such as butadiene, isoprene or mixtures thereof. It is essential to the present invention that the 1,2-vinyl polydiene microstructure content of the polydiene block be not greater than 25 percent, the 1,2-vinyl content being computed from the infrared spectrum by the method of P. Morero et al., as set forth in Chim. Ind. Milan, 41,758 (1959), and the glass transition temperature ($T_g$) of these polydienes be not greater than about $-60°$ C. as determined by a Perkin-Elmer differential scanning calorimeter, model DSC2, when a sample is heated at a rate of 20° C. per minute. Block copolymers in accordance with the present invention may be of the linear ABA configuration or the branched configuration such as $AB(BA)_n$. In the preparation of a linear polymer such as of the ABA configuration, a difunctional lithium catalyst is employed whereas in the preparation of the simplest branched polymer having the structure $AB(BA)_n$ a multifunctional lithium polymerization initiator is employed. Multifunctional lithium containing initiators are well known in the art as is the use of such initiators in the polymerization of olefinically unsaturated hydrocarbon monomers. Such polymers and initiators are disclosed in the following U.S. Pat. Nos. 3,660,536; 3,663,634; 3,668,263; 3,684,780; 3,725,368; 3,734,973; 3,776,893; 3,776,964; 3,784,637; 3,787,510; 3,954,894; 4,172,100; 4,172,190; 4,182,818; 4,196,153; 4,196,154; 4,200,718; 4,201,729; 4,205,016.

References of record in the parent application include the following U.S. Pat. Nos. 3,265,765; 3,912,793; 3,925,512; 4,089,913 and 4,136,137.

The invention is illustrated but not limited by the following examples wherein all parts are parts by weight unless otherwise specified; vinyl 1,2 content was computed from the infrared spectrum (IR) by the method of Morero et al.; and glass temperature determined by employing a Perkin-Elmer scanning calorimeter (DSC) at a heating rate of 20° C. per minute. All reactions in polymerization were conducted in a dry nitrogen atmosphere.

EXAMPLE 1

A dilithium initiator was prepared by admixing 4.1 milliliters of cyclohexane containing 2.25 millimoles of secondary butyllithium with 18 milliliters of toluene containing 1.15 millimoles of 1,3-di(1-phenylethenyl)-benzene. The resulting mixture was dark red in color and was maintained at a temperature between about 25° and 30° C. for a period of two and one-half hours.

An ABA block copolymer was prepared in the following manner: A one-liter flask was charged with 350 milliliters of cyclohexane, 30 grams of 1,3-butadiene and 55 milliliters of α-methylstyrene. The resultant mixture was treated with 0.25 millimole of secondary butyllithium in inactivate any moisture, oxygen or active hydrogen compounds which would interfere with the action of the previously prepared dilithium initiator. The initiator previously prepared was added to the flask employing a syringe. A water bath maintained between about 50° and 60° C. was employed to maintain polymerization temperature. One hundred and thirty minutes after the addition of dilithium initiator 2 milliliters of styrene were added to the reaction mixture, the water bath temperature was lowered to 20° C. and 40 milliliters of tetrahydrofuran was added to the flask. On addition of the tetrahyrofuran, the polymerization solution in the flask changed from yellow to a reddish brown color. A syringe pump was employed to add 32 milliliters of styrene to the reaction mixture continuously over a period of 3 hours. The water bath temperature was maintained at about 20° C. during the styrene addition. About 5 minutes after the completion of the styrene addition, 4 milliliters of methanol were added to the reaction mixture to inactivate the living polymer therein. The polymer was recovered from the reaction mixture by precipitation in methanol. The polymer after drying in a vacuum oven weighed 102 grams. The molecular weight of the block copolymer was 99,000 molecular weight units as determined by gel permeation chromatography. The polymer composition was calculated to be 29 weight percent butadiene and the styrene to α-methylstyrene mole ratio was 1:1.2. 82 Weight percent of the α-methylstyrene was polymerized. The styrene and butadiene were polymerized quantitatively. A portion of the copolymer was compression molded and found to have the following physical properties:

| | |
|---|---|
| Tensile Yield | 4100 pounds per square inch |
| Elongation | 14 percent |
| Modulus $\times 10^5$ | 2.80 pounds per square inch |
| Izod Impact | 0.58 foot pounds per inch |
| Clarity | 0.008 1/mils |
| Vicat Softening | 120° C. |

EXAMPLES 2–7

In Examples 2 to 7, the procedure of Example 1 was repeated with the exception that feed compositions were altered to provide block copolymers of various composition. Table I sets forth the amount and type of material used in each of the examples, while Table II lists the end-block polymerization conditions; Table III shows the physical properties of the high heat distortion transparent impact copolymer, and Table IV the composition and properties of the thermoplastic elastomers. In the Tables I through IV, the following abbreviations are employed:

| | |
|---|---|
| m-mole millimole | αMS alpha-methylstyrene |
| g grams | psi pounds per square inch |
| ml milliliter | ft foot |
| wt weight | lb pound |
| s styrene | in inch |

TABLE I

MATERIALS USED IN EXAMPLES 2 TO 7

| Example Number | Dilithium Initiator* 1,3-PEB (m-mole) | S—BuLi (m-mole) | Monomers Butadiene (g) | α-Methylstyrene (ml) | Styrene (ml) | Solvents Cyclohexane (ml) | THF (ml) |
|---|---|---|---|---|---|---|---|
| 2 | 1.15 | 2.25 | 30 | 75 | 18 | 360 | 40 |
| 3 | 1.16 | 2.28 | 30 | 40 | 48 | 370 | 32 |
| 4 | 1.16 | 2.28 | 43 | 51 | 30 | 350 | 40 |
| 5 | 0.84 | 1.67 | 21 | 65 | 40 | 360 | 40 |
| 6 | 0.64 | 1.26 | 33 | 25 | 11 | 360 | 40 |
| 7 | 1.86 | 3.69 | 110 | 42 | 19 | 900 | 100 |

*1,3-PEB = 1,3-di(1-Phenylethenyl)benzene
S—BuLi = Secondary Butyllithium

TABLE II

THE END BLOCKS POLYMERIZATION CONDITIONS

| Example Number | End Blocks Polymerization Temp. °C. | Styrene Addition Time Min. | Wt. of Copolymer g | % Alpha-Methylstyrene Polymerized |
|---|---|---|---|---|
| 2 | 30 | 180 | 93 | 68 |
| 3 | 31 | 135 | 103 | 80 |
| 4 | 26 | 185 | 111 | 87 |
| 5 | 26 | 170 | 107 | 86 |
| 6 | 20 | 170 | 57 | 60 |
| 7 | 26 | 175 | 155 | 74 |

TABLE III

COMPOSITION AND PROPERTIES OF HIGH HEAT DISTORTION TRANSPARENT IMPACT COPOLYMERS FROM EXAMPLES 2 TO 5

| Example Number | Mol. Wt. $\times 10^{-3}$ | Butadiene Wt. % | Mole Ratio S/αMS | Tensile Yield psi | % Elongation | Modulus $\times 10^5$ psi | Izod Impact ft-lb/in | Vicat Softening °C. |
|---|---|---|---|---|---|---|---|---|
| 2 | 102 | 32 | 1:2.5 | 3430 | 11.7 | 1.85 | 0.76 | 128 |
| 3 | 92 | 29 | 1:0.6 | 3500 | 13.7 | 1.89 | 0.61 | 102 |
| 4 | 112 | 39 | 1:1.3 | 2470 | >350 | 1.25 | 1.39 | 120 |
| 5 | 162 | 20 | 1:1.3 | 4330 | 4.3 | 2.83 | 0.61 | 118 |

TABLE IV

COMPOSITION AND PROPERTIES OF HIGH SERVICE TEMPERATURE THERMOPLASTIC ELASTOMERS FROM EXAMPLES 6 AND 7

| Example Number | Mol. wt. $\times 10^{-3}$ | Butadiene Wt. % | Mole Ratio S/αMS | Tensile Rupture psi | % Elongation |
|---|---|---|---|---|---|
| 6 | 112 | 58 | 1:1.2 | 3970 | 775 |
| 7 | 93 | 71 | 1:1.5 | 3930 | 925 |

EXAMPLE 8 (Comparative)

For purposes of comparison 5 polybutadienes were prepared employing the adduct of 1,3-di(1-phenylethenyl)benzene and secondary butyllithium with cyclohexane as a solvent.

Run 1: The dilithum initiator was prepared employing the procedure of Example 1 with the exception that 1.32 millimoles of secondary butyllithium was employed with 0.66 millimole of 1,3-di(1-phenylethenyl)benzene. A 1-liter polymerization flask was charged with 420 milliliters of cyclohexane and 38 grams of butadiene. Contents of the flask were treated with 0.09 millimoles of secondary butyllithium to remove moisture, oxygen and other impurities which would interfere with the dilithium initiator. The dilithium initiator was transferred to the polymerization flask by means of a syringe. Polymerization was permitted to proceed for a period of three hours while the flask was maintained in a water bath having a temperature of 45° to 60° over the polymerization period. After the three hour polymerization period, 3 milliliters of methanol were added to the reaction mixture to terminate the living polymer. The polymer was precipitated in methanol and dried.

Run 2 was a duplication of Run 1 with the exception that 50 milliliters of α-methylstyrene was added as part of the polymerization solvent (note under such conditions α-methylstyrene was not and would not be incorporated into the polymeric chains).

Run 3: The procedure of Run 1 was repeated with the exception that 380 milliliters of cyclohexane and ½ milliliter of tetrahydrofuran were employed as the polymerization solvent.

Run 4: The procedure of Run 1 was repeated with the exception that 1 milliliter of tetrahydrofuran was added to the cyclohexane as polymerization solvent.

Run 5: The procedure of Run 1 was repeated with the exception that 380 milliliters of cyclohexane and 1.8 milliliters of tetrahydrofuran were used as the polymerization solvent. Polymers from these runs were analyzed for 1,2 vinyl content, Cis and Trans content and glass transition temperature ($T_g$). The results are set forth in Table V.

TABLE V

MICROSTRUCTURE AND $T_g$ OF POLYBUTADIENES BY IR AND DSC

| Run # | 1,2-% | Trans 1,4-% | Cis 1,4-% | $T_g$ (°C.) |
|---|---|---|---|---|
| 1 | 9.0 | 54.7 | 36.3 | −95 |
| 2 | 9.9 | 53.6 | 36.5 | −96 |
| 3 | 38.2 | 36.7 | 25.1 | −75 |
| 4 | 44.1 | 33.2 | 22.7 | −71 |
| 5 | 57.1 | 24.9 | 18.0 | −60 |

EXAMPLE 9

Preparation of styrene α-methylstyrene butadiene ABA polymer. The procedure of Example 7 was repeated with the exception that 0.95 milliliters of tetrahydrofuran was added prior to the butadiene polymerization and the α-methylstyrene was added at the end of the butadiene polymerization. The materials employed were as follows:

| Dilithium Initiator | | |
|---|---|---|
| 1,3-di(1-phenylethenyl)benzene | 0.67 m mole | |
| Secondary butyllithium | 1.33 m mole | |
| Polymerization Solvent | | |
| Cyclohexane | 380 ml | During butadiene polymerization |
| THF | 0.95 ml | |
| THF | 41 ml | After butadiene polymerization complete |
| Monomers | | |
| Butadiene | 38 g | |
| α-Methylstyrene | 16 ml | |
| Styrene | 6.5 ml | |

The resultant copolymer contained 72 weight percent butadiene with 45 mole percent 1,2-vinyl in polybutadiene microstructure and had a styrene to α-methylstyrene mole ratio of 1:1.3. The glass transition temperatures ($T_g$) of the polybutadiene center block (with 45% 1,2-content) of this copolymer and that of the copolymer prepared in Example 7 (the polybutadiene center block had 10% 1,2-content) were determined by DSC.

| Sample | 1,2 Content of PBD Center Block | $T_g$ of polybutadiene Center Block °C. |
|---|---|---|
| Example 7 | 10% | −94 |
| Example 9 | 45% | −69 |

These values agree with the $T_g$-microstructure relationship of pure polybutadiene prepared in Example 8.

EXAMPLE 10

Preparation of ABA isoprene block copolymer. A dilithium initiator was prepared by admixing 2.5 milliliters of a solution of 1.44 millimoles of secondary butyllithium in cyclohexane and 15 milliliters of a toluene solution of 0.71 millimoles of 1,3-di(1-phenylethenyl)-benzene. The resultant solution was dark red in color and was maintained at a temperature of from about 25° to 30° C. for twenty hours. At the end of that period of time 1 milliliter of isoprene was added, and a water bath having a temperature of from 60° to 70° C. was used to heat the reaction vessel and contents for a period of 7 minutes to provide polymerization initiating solution. A one-liter flask was charged with 370 ml of cyclohexane, 49 ml of isoprene and 15 ml of α-methylstyrene. To the resultant mixture was added 0.17 millimole of secondary butyllithium to remove moisture, oxygen and other impurities which would be harmful to the dilithium initiator. The dilithium initiator solution was added to the polymerization vessel by means of a syringe, and a water bath at a temperature of between 40° and 60° C. was employed to control the temperature of the polymerization mixture. One-half milliliter of styrene was added to the polymerization mixture 70 minutes after the addition of the initiator solution. The temperature of the water bath was lowered to about 25° C. and 40 milliliters of tetrahydrofuran was added to the polymerization mixture. The polymerization mixture changed from yellow to a reddish brown color. An additional 6 milliliters of styrene was continuously added to the polymerization mixture from a syringe pump over a period of 160 minutes. The temperature of the water bath was maintained at about 26° C. and 3 milliliters of methanol were added to the polymerization mixture about 5 minutes after the completion of the styrene addition. The polymer was recovered from the polymerization mixture by precipitation in methanol. The polymer weighed 47.5 grams after drying. The molecular weight of the copolymer was 129,000 molecular weight units as determined by gel permeation chromatography. The copolymer was calculated to contain 72 weight percent isoprene and the styrene to α-methylstyrene mole rate was 1:1.1. 55 Weight percent of the α-methylstyrene was polymerized. The styrene and isoprene were polymerized quantitatively. The dried block ABA copolymer was compression molded and tested with the following results.

| Tensile strength at rupture | 3900 pounds per square inch |
|---|---|
| Elongation | 1325 percent |

EXAMPLE 11

The procedure of Example 1 was employed to prepare a triblock copolymer of the structure: (vinyltoluene-∼α∼-methylstyrene)-butadiene-(vinyltoluene-∼α∼-methylstyrene). The materials and conditions which differ from Example 1 are as follows:

The dilithium initiator is the addition product of 0.70 millimoles of 1,3-bis[1-(4-methyl)ethenyl]benzene and 1.39 millimoles of secondary butyllithium, 44 grams of butadiene, 16.8 milliliters of ∼α∼-methylstyrene, 8.2 milliliters of vinyltoluene which contained about 33 weight percent of the para isomers and 67 weight percent of the meta isomers. 360 Milliliters of cyclohexane was used and 40 milliliters of tetrahydrofuran. The end blocks were polymerized at 30° C., the vinyltoluene added over a period of 160 minutes. 59 Grams of copolymer were obtained and 53 weight percent of the α-methylstyrene had polymerized. The triblock polymer had a molecular weight of 116,000 mole weight units, the polymer contained 74 weight percent butadiene. The mole ratio of vinyltoluene to α-methylstyrene was 1:1.1. The triblock polymer had a tensile strength at rupture of 3400 pounds per square inch and an elongation of 975 percent.

Polymers in accordance with the present invention exhibit a substantially improved service temperature when compared to block copolymers having polystyrene terminal blocks. The polymers of the present invention are readily heat fabricated by extrusion or injection molding and do not exhibit undesired thermal degradation observed when a polymer is used which has terminal blocks of polyalphamethylstyrene. Polymers in accordance with the present invention are readily polymerized at ambient temperatures, whereas polymers having polyalphamethylstyrene terminal blocks must be polymerized at low temperature such as from about −20° to −70° C. and the polymerization progresses at an undesirably slow rate.

In a manner similar to the foregoing examples, other advantageous polymers are prepared when styrene is replaced with paravinyltoluene, a mixture of meta and paravinyltoluene, orthovinyltoluene, methaethylstyrene, paratertiarybutylstyrene, paraisopropylstyrene, orthoparadiethylstyrene and the like. The α-methylstyrene may be replaced with para-methyl-α-methylstyrene, meta-isopropyl-α-methylstyrene, orthometadiethyl-α-methylstyrene and the like to provide desirable block copolymers.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the preparation of a block copolymer having the configuration $AB(BA)_n$ wherein n is an integer of from 1 to 3 inclusive; A represents a block which is a random copolymer of an alkenyl aromatic monomer and an α-methylstyrene monomer, wherein the mole ratio of alkenyl aromatic monomer to α-methylstyrene monomer ranges from 1:0.5 to 1:2.5; B represents a polydiene selected from a group consisting of 1,3-butadiene, isoprene and mixtures thereof where the polydiene contains not over 25 mole percent 1,2 vinyl groups, the polydiene blocks having polymerized therein from 0 to 10 weight percent of a monovinyl aromatic compound, the polydiene blocks being 2 to 98 weight percent and the alkenyl aromatic monomer α-methylstyrene blocks being from 98 to 2 weight percent of the polymer, the steps of the method comprising polymerizing the diene monomer in a hydrocarbon solvent, and optionally in the presence of the α-methylstyrene monomer, employing a multifunctional lithium polymerization initiator in the absence of oxygen and moisture at a temperature of from about 40° to 120° C. to provide a living diene polymer block of desired molecular weight dissolved in the hydrocarbon solvent, adding a polar solvent to the hydrocarbon solvent containing the living diene polymer and the α-methylstyrene monomer, adding α-methylstyrene monomer if not already present, and then adding continuously the alkenyl aromatic monomer at a rate whereby a random alkenyl aromatic monomer-α-methylstyrene monomer polymer blocks are polymerized and chemically attached to the polydiene block.

2. The method of claim 1 wherein the polydiene is polymerized in the presence of the α-methylstyrene monomer.

3. The method of claim 1 wherein the polydiene is from about 10 to 40 weight percent of the polymer prepared.

4. The method of claim 1 wherein the polydiene is from about 55 to 90 weight percent of the polymer prepared.

5. The method of claim 1 wherein n is one.

6. The method of claim 1 wherein the glass temperature of the polydiene prepared is not greater than −60° C.

7. The method of claim 1 wherein the polydiene is 1,3-polybutadiene.

8. The method of claim 1 wherein the polydiene is polyisoprene.

9. The method of claim 1 wherein the alkenyl aromatic monomer is styrene.

10. The method of claim 1 wherein the molecular weight of the block copolymer is from about 5,000 to 500,000 molecular weight units.

11. The method of claim 10 wherein the molecular weight of the block copolymer is from about 80,000 to 300,000 molecular weight units.

12. The method of claim 1 wherein the ratio of alkenyl aromatic monomer to α-methylstyrene is from about 1:1 to about 1:2.

* * * * *